United States Patent [19]

Wills et al.

[11] Patent Number: 5,252,905
[45] Date of Patent: * Oct. 12, 1993

[54] DRIVING SYSTEM FOR SINGLE PHASE A-C INDUCTION MOTOR

[75] Inventors: Frank E. Wills; Jacob E. Shaffer, Jr., both of York, Pa.

[73] Assignee: York International Corporation, York, Pa.

[*] Notice: The portion of the term of this patent subsequent to Mar. 17, 2004 has been disclaimed.

[21] Appl. No.: 132,614

[22] Filed: Dec. 10, 1987

Related U.S. Application Data

[63] Continuation of Ser. No. 812,571, Dec. 23, 1985, abandoned.

[51] Int. Cl.$^5$ ............................................. H02P 7/00
[52] U.S. Cl. ...................................................... 318/807
[58] Field of Search .................. 318/778, 799–812, 318/599, 85; 363/41

[56] References Cited

U.S. PATENT DOCUMENTS

| | | | |
|---|---|---|---|
| 3,753,069 | 8/1973 | Newton | 318/778 |
| 3,875,483 | 4/1975 | Farr . | |
| 4,024,444 | 5/1977 | Dewan et al. . | |
| 4,330,817 | 5/1982 | Avar et al. . | |
| 4,333,042 | 6/1982 | Kawada et al. | 318/811 |
| 4,408,268 | 10/1983 | Peters et al. | 318/811 |
| 4,409,533 | 10/1983 | Kawabata | 318/778 |
| 4,409,534 | 10/1983 | Bose . | |
| 4,417,193 | 11/1983 | Hirata | 318/808 |
| 4,419,615 | 12/1983 | Muto et al. . | |
| 4,445,167 | 4/1984 | Okado . | |
| 4,447,786 | 5/1984 | Saar et al. . | |
| 4,449,175 | 5/1984 | Ishii et al. . | |
| 4,451,112 | 5/1984 | Hattori et al. | 318/778 |
| 4,466,052 | 8/1984 | Thrap | 363/41 |
| 4,491,778 | 1/1985 | Knox et al. | 318/811 |
| 4,519,022 | 5/1985 | Glennon . | |
| 4,546,422 | 10/1985 | Okado . | |
| 4,566,289 | 1/1986 | Iizuka et al. | 318/807 |
| 4,591,964 | 5/1986 | Kemstedt . | |
| 4,651,079 | 3/1987 | Wills | 318/811 |
| 4,706,180 | 11/1987 | Wills . | |

FOREIGN PATENT DOCUMENTS

| | | | |
|---|---|---|---|
| 55-74399 | 4/1980 | Japan . | |
| 58-112493 | 7/1983 | Japan | 318/778 |
| 60-02505 | 6/1985 | Japan . | |

*Primary Examiner*—Jonathan Wysocki
*Attorney, Agent, or Firm*—Finnegan, Henderson, Farabow, Garrett & Dunner

[57] ABSTRACT

By employing a single phase pulse width modulated inverter system, a-c power line voltage may be effectively converted to single phase, variable amplitude and frequency sinusoidal voltage for driving a single phase a-c induction motor at an adjustable speed. The motor may be driven directly in response to the power line voltage (such as during start-up or when it is desired to run the motor at the power line frequency) by bypassing the inverter system and connecting the motor across the power line. Reduced energy consumption may be obtained by operating the motor in response to a reduced inverter output frequency. Switching the motor from the power line to the inverter, and vice versa, is accomplished without interruption. Immediately prior to each, switchover the inverter output voltage is synchronized to the power line voltage to minimize any electrical disturbance during the switching transition.

13 Claims, 2 Drawing Sheets

DRIVING SYSTEM FOR SINGLE PHASE A-C INDUCTION MOTOR

This application is a continuation of application Ser. No. 812,571, filed Dec. 23, 1985 now abandoned.

BACKGROUND OF THE INVENTION

This invention relates to a simplified, highly efficient driving system for producing, from a-c power line voltage, adjustable amplitude and frequency alternating voltage to drive an a-c induction motor, while at the same time minimizing power losses and energy consumption.

Inverter systems have been employed to convert fixed frequency a-c power line voltage to variable frequency and amplitude alternating voltage for operating an a-c induction motor, but most of these systems are very inefficient in that highly distorted current waveforms, having substantial harmonic content, result, causing excessive power losses in both the inverter and the motor, excessive motor heating and noisy (hum) motor operation. These shortcomings are particularly pronounced when the motor is of the single phase type.

The motor driving system of the present invention is a significant improvement over the prior systems since a much higher efficiency level is attained, making the invention particularly attractive when used to drive a single phase a-c induction motor. Moreover, the driving system of the invention has different operating modes in which enhanced power savings and energy reduction are achieved.

SUMMARY OF THE INVENTION

The driving system of the invention comprises an a-c power line for providing single phase a-c power line voltage at a fixed frequency. A single phase pulse width modulated inverter system is coupled to the power line and converts the a-c power line voltage to single phase, adjustable amplitude and frequency sinusoidal output voltage for application to a single phase a-c induction motor to drive the motor at a variable speed. Switching means are provided for effectively bypassing the single phase pulse width modulated inverter system and applying the a-c power line voltage directly to the motor to drive the motor at a fixed speed determined by the power line frequency.

DESCRIPTION OF THE DRAWINGS

The features of the invention which are believed to be novel are set forth with particularity in the appended claims. The invention may best be understood, however, by reference to the following description in conjunction with the accompanying drawings in which:

DESCRIPTION OF THE ILLUSTRATED EMBODIMENT

Figure 1:
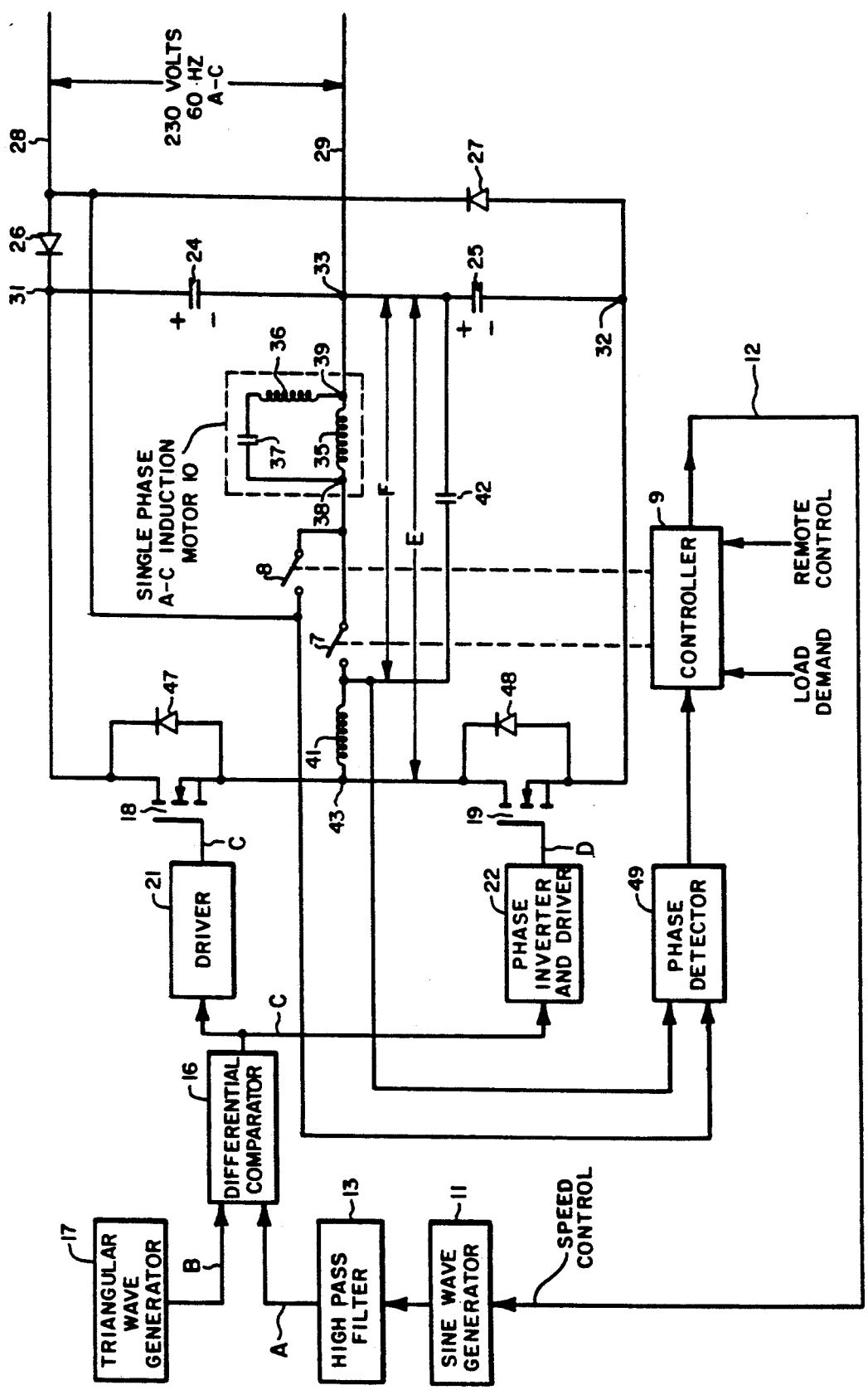
FIG. 1 schematically illustrates a driving system, constructed in accordance with the invention, and the manner in which that system is coupled to a single phase a-c induction motor to apply thereto single phase, adjustable amplitude and frequency sinusoidal voltage.

Referring to FIG. 1, it will be assumed initially that switch 7 is closed and switch 8 is opened by controller 9. As will be made apparent, controller 9 may take a variety of different forms to perform certain functions. In its simplest form, the controller includes manually operated devices or switches that in turn control the positioning of switches 7 and 8, which may be solid state switches, relay-operated contacts, or the like. With switch 7 closed and switch 8 opened, variable frequency and amplitude, single phase a-c power will be supplied to single phase a-c induction motor 10 and the frequency of that power will be determined by the output of sine wave generator or oscillator 11. The generator has a "speed control" input to which a control signal may be delivered over conductor 12 from controller 9 to adjust the generator's frequency, thereby to control the speed of motor 10. The control signal may be derived by sensing some parameter or characteristic of the system, in which the inverter-motor system is incorporated, in order to automatically control the motor speed in response to that sensed information. On the other hand control of the frequency of the sinusoidal voltage waveform produced by generator 11 may be effected merely by means of an appropriate manually adjustable control, such as a potentiometer, in generator 11. In a specific application of the invention, motor 10 may be the compressor motor in an air conditioning system or heat pump, in which case the compressor speed (and consequently capacity) would be modulated in response to the temperature (load) demand in order to maintain a constant desired temperature. For this reason, controller 9 is provided with an input labelled "load demand" to receive the sensed temperature information. Preferably, motor 10 will be operated over a frequency or speed range from about 12 to 60 hertz.

The voltage applied to the motor will be adjusted to vary in direct proportion to frequency, or speed, changes so that the ratio of the motor voltage to frequency will always remain the same. A fixed or constant amplitude/frequency ratio is desirable, when driving a motor, for a variety of reasons, such as to avoid overheating of the motor and to provide the motor with a constant torque output capability regardless of motor speed. In order to achieve a constant ratio of the amplitude of the motor voltage relative to the voltage's frequency, the variable frequency sinusoidal voltage from generator 11 is passed through a high pass filter 13 whose cut-off frequency lies above the upper limit of the 12 to 60 hertz operating frequency range. Preferably, the frequency response curve has a slope of about 6 db per octave. With such an arrangement, the sine wave voltage from generator 11 will be attenuated by the high pass filter 13 in an amount inversely proportional to the frequency of the sine wave. In this way, the amplitude of the sine wave, at the output of the filter, will vary in step with, and directly proportional to, frequency changes in generator 11 and, as will be appreciated, this will achieve a constant motor voltage/frequency ratio. It should be noted, however, that the employment of high pass filter 13 to automatically adjust the amplitude of the sine wave as a function of frequency provides a very simple and inexpensive circuit for achieving that result.

Figure 2:
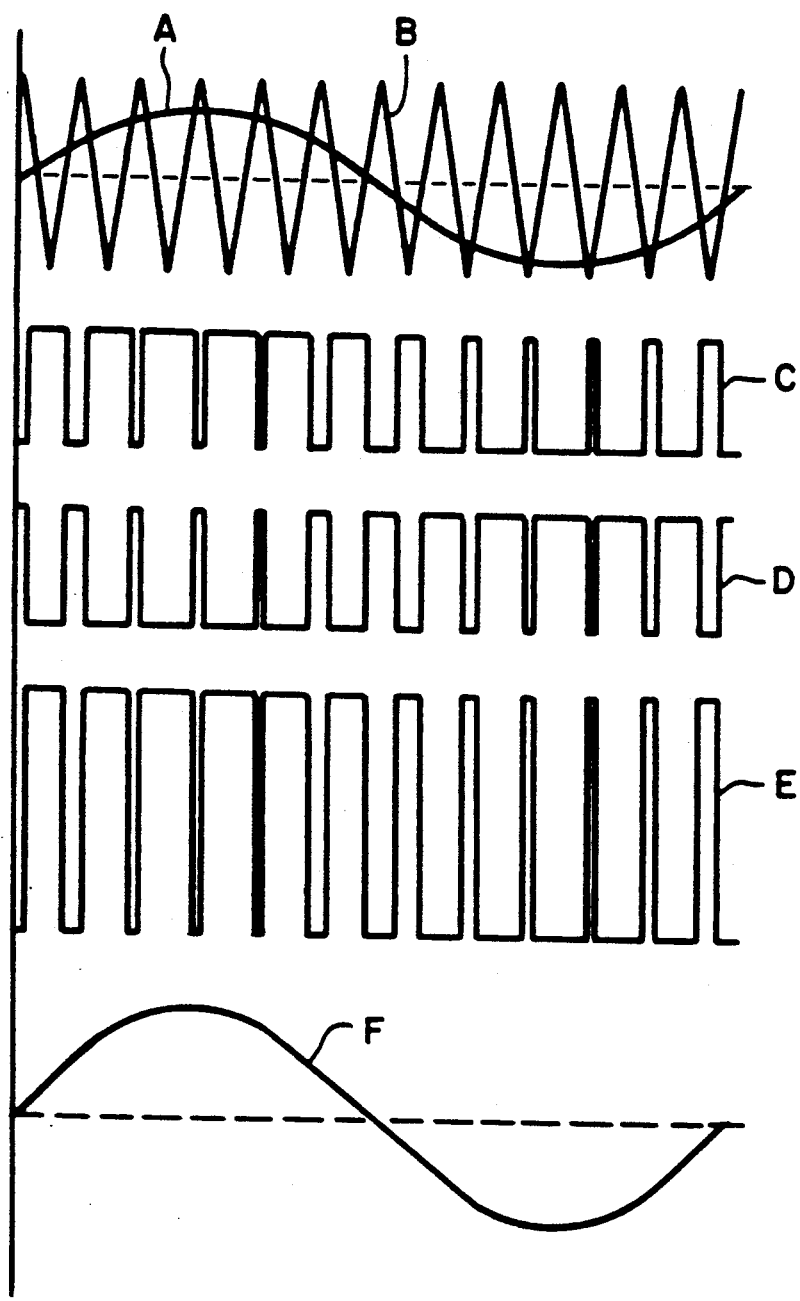
FIG. 2 depicts various voltage waveforms that appear in the driving system and will be helpful in understanding the operation of the invention.

The adjustable amplitude and frequency sinusoidal voltage produced at the output of filter 13, and applied to one input of differential comparator 16, is depicted by voltage waveform A in FIG. 2. The other input of comparator 16 receives the output voltage (waveform B) from triangular wave generator 17. For illustrative purposes, the frequency of the triangular wave B is only twelve times the frequency of the sine wave A, but in practice the triangular shaped signal would have a fixed frequency of at least 10 kilohertz for reasons to be explained. When the sine wave and the triangular wave intercept one another (namely are equal in amplitude), comparator 16 switches operating states between its high and low levels, as a result of which the comparator produces a sinusoidally weighted pulse width modulated switching signal (waveform C) having a switching frequency component equal to the fixed frequency of the triangular wave B and a sine wave modulation component equal to the adjustable frequency of sine wave A. The arrangement of circuits 11-17 is particularly attractive in that it may be implemented with inexpensive low voltage logic circuits.

By observing waveforms A, B and C it is apparent that during each of the twelve cycles of the triangular wave B, a single positive-going pulse appears in the switching signal of waveform C and the duty cycle of that single pulse (namely, the width or duration of the pulse relative to the period or duration of the complete cycle) is determined by the instantaneous amplitude of the sine wave of waveform A. Specifically, the area of each positive-going pulse in the switching signal represents the amplitude of the sine wave at that instant. During each successive cycle of the triangular wave, the duty cycles change slightly since the instantaneous amplitude of the sine wave is changing. If the RMS (root mean square) amplitude of the sine wave is then varied, the duty cycle of each positive-going pulse will also change. On the other hand, if the frequency of the sine wave changes, the duty cycle will also change. In addition, the rate at which the duty cycles change from one switching interval (namely from one cycle of the triangular wave) to the next will be varied.

The sinusoidally weighted pulse width modulated switching signal of waveform C is employed to turn a pair of solid state power switches 18 and 19 on and off in alternation (namely, one being on while the other is off and vice versa) to connect the motor 10 alternately across positive and negative high d-c voltage (compared to the low d-c voltage needed in the logic circuits) power supplies. More particularly, each of power switches 18 and 19 is preferably a field effect transistor, specifically a MOSFET, having source, drain and gate terminals. Since field effect transistors have high switching speeds they can be operated at high switching frequencies. The switching signal of waveform C is applied via driver 21 and in phase to the gate of power switch 18, whereas the switching signal is applied via phase inverter/driver 22 in phase opposition (180° out of phase), as shown by waveform D, to the gate of power switch 19. Each power switch is gated on in response to a positive-going pulse applied to its gate. Hence, whenever a positive-going pulse of waveform C turns switch 18 on, switch 19 will be off, and conversely whenever a positive-going pulse of waveform D renders switch 19 conductive, switch 18 will be non-conductive.

The positive and negative power supplies are provided by capacitors 24 and 25 and rectifier diodes 26 and 27. Single phase a-c power line voltage, such as 230 volts, 60 hertz A-C, is received over the a-c power line, comprising line conductors 28 and 29, and is rectified by diodes 26 and 27 to charge capacitors 24 and 25 with the polarity indicated in FIG. 1. To elaborate, during each positive half cycle of the applied 230 volts A-C when the voltage on line conductor 28 is positive relative to that on conductor 29, current flows through diode 26 to charge capacitor 24. During the alternate negative half cycles when the voltage on conductor 29 is positive with respect to the voltage on conductor 28, current flows to capacitor 25 and through diode 27. By appropriately matching the circuit elements, the d-c voltages across capacitors 24 and 25 will be equal in magnitude but opposite in polarity. Thus, capacitors 24 and 25 constitute a balanced d-c voltage source having a positive terminal 31, a negative terminal 32 and a neutral terminal 33 which is connected to conductor 29. A positive power supply is provided between positive terminal 31 and neutral terminal 33, while a negative power supply exists between terminals 32 and 33.

Single phase a-c induction motor 10 is of conventional construction and is of the permanent split capacitance type having, in delta connection, a pair of field windings 35 and 36 and a phase shift capacitor 37. When a-c voltage is applied to the motor terminals 38 and 39, and thus across winding 35, the voltage will be phase shifted almost 90° by capacitor 37 for application to winding 36. This is necessary to effect motor rotation.

A low pass filter, comprising inductance coil 41 and capacitor 42, is effectively coupled in series with motor 10 when switch 7 is closed. Specifically, coil 41 is connected between motor terminal 38 and circuit junction 43 which connects to the source terminal of power switch 18 and to the drain terminal of power switch 19. Capacitor 42 is shunt connected across motor 10.

In operation of the driving system for motor 10 when switch 7 is closed and switch 8 is opened, each time power switch 18 is switched on, namely during each positive-going pulse of waveform C (at which time switch 19 will be off), the positive d-c voltage at terminal 31 will be applied to circuit junction 43 and thus across the series arrangement comprising filter 41, 42 and motor 10. On the other hand, each time power switch 19 is gated on by a positive-going pulse of waveform D, the negative d-c voltage at terminal 32 will be applied to terminal 43 and across the filter-motor circuit. As a result, voltage waveform E will appear between terminal 43 and neutral terminal 33 and thus across filter 41, 42 and motor 10. Since the switching frequency is so high (at least 10 kilohertz as mentioned), relatively inexpensive and small filter elements 41, 42 may be employed to remove from the signal of waveform E all signal components except the fundamental of the sine wave modulating frequency. The higher the ratio of the switching frequency to the sine wave modulating frequency, the higher will be the frequencies of the unwanted harmonics in waveform E and the easier may those harmonics be filtered out by low pass filter 41, 42. The greater the frequency separation between the modulating and switching frequencies, the simpler it is to eliminate the sidebands of the switching signal component. In other words, due to the wide separation of the wanted frequency component and the unwanted components, the inverter output (waveform E) can easily be filtered to give a pure sinusoidal output voltage waveform. Because of the high switching frequency used, all harmonics of any significance are of such a frequency that filtering can be accomplished with small and inexpensive circuit elements.

Moreover, since the switching frequency is so high relative to the modulating frequency, it is not necessary to correlate or synchronize the modulating and switching frequencies. Usually, the switching frequency is an integer multiple of the modulating frequency to avoid beat frequencies, and when the modulating frequency is changed, the switching frequency is also usually varied to maintain that desired relationship so that beat frequencies are not created. With the high switching frequency any beat frequencies are easily removed by filter 41, 42 so there is no need to have a switching frequency that is an integer multiple of the modulating frequency. As a consequence, the modulating frequency may be adjusted thoughout its range (which is preferably from 12 to 60 hertz as mentioned) and the switching frequency, namely the frequency of the triangular wave produced by generator 17, may remain constant. This simplifies the construction of generator 17. In addition, such a fixed switching frequency allows the use of a resonant filter tuned to the switching frequency.

Since low pass filter 41, 42 removes all of the unwanted signal components in waveform E, only the perfect sinusoidal voltage shown by waveform F will be applied to the motor terminals 38 and 39 and thus will appear between terminal 38 and the neutral terminal 33. This sine wave voltage is, of course, identical to and is an exact simulation of the basic sine wave of waveform A. A highly efficient system is therefore provided. Genuinely sinusoidal, single phase voltage and current waveforms are produced in motor 10, while providing no motor performance degradation, namely minimum power losses, motor heating and motor noise.

Diodes 47 and 48, which shunt power switches 18 and 19, respectively, function to provide a path for the flow of reactive energy.

Operation of motor 10 directly in response to the a-c power line voltage may be effected by controller 9 merely by opening switch 7 and closing switch 8. Such an operating mode is advantageous under certain operating conditions. Specifically, during start-up it is desirable to connect the motor directly across the power line 28, 29 so that the inverter system does not have to handle the starting current inrush. Moreover, if it is desired to run the motor at the power line frequency (60 hertz), which would be the full speed produced by the inverter system under maximum load demand in the illustrated embodiment, the inverter system may be effectively bypassed by switches 7 and 8 to eliminate full load losses associated with the inverter and the attendant adverse effect on system efficiency.

As mentioned, controller 9 may be manually adjusted to control switches 7 and 8. Alternatively, the controller may include logic circuits or a microprocessor to control the driving system for motor 10. Assuming that motor 10 constitutes the compressor motor in a heat pump or air conditioner, the compressor motor could be started across the power line 28, 29 in response to temperature (load) demand. After some period of operation at full speed, as temperature (load) is satisfied the heat pump or air conditioner may be switched over so that the inverter output voltage would drive the motor and the compressor speed would be modulated to balance the load. If the load demand increased to 100%, the controller could switch operating modes to bypass the inverter system and connect the motor directly across the power line.

Preferably, a switchover in the driving voltage applied to the motor, from the inverter output to the power line or vice versa, is achieved without interruption and with minimum electrical disturbance during the switching transition. This may be accomplished by synchronizing the inverter output voltage to the power line voltage just before a switch is made. In other words, immediately prior to a switchover the amplitude, frequency and phase of the inverter output voltage are adjusted as necessary to match the corresponding characteristics of the power line voltage. Such synchronization is facilitated by means of phase detector 49 and controller 9. The controller may be programmed to run the inverter at its maximum frequency (60 hertz) prior to a switchover. High pass filter 13 ensures that at maximum speed the amplitude of the inverter output voltage will be approximately that of the power line voltage. The phase detector receives the inverter output voltage and the power line voltage on respective ones of its two inputs and determines when those two voltages are in phase, thereby indicating when the frequencies of the voltages are equal. When the frequencies of the inverter output voltage and power line voltage are equal, those voltages will therefore have substantially the same magnitude and at that time controller 9 will effect switching over from power line voltage to inverter output voltage or vice versa.

The driving system of the invention also facilitates a reduction in energy consumption since the system my be operated in a reduced power mode. In this operating mode controller 9 will connect the inverter system to motor 10 and will decrease the inverter frequency to a level substantially less than the power line frequency. While the capacity is reduced, a considerable power savings would be achieved. The driving system could be established in the reduced power mode by manually operated switches in controller 9. On the other hand, and this is a salient feature of the invention, controller 9 may be remotely actuated, over its "remote control" input, by a command signal transmitted (for example, via a radio link or a wire connection) from the electric utility company or by a command signal locally generated by a timing device. Although this would result in a forced reduction of user capacity, it would allow the power company to unburden itself during peak demand periods.

It should also be appreciated that the driving system of the invention can easily be connected in an existing installation, namely retrofited, with no modification of the single phase induction motor. In an installation where a-c power line voltage is applied directly to a single phase induction motor to effect motor rotation at a constant speed, the driving system can be effectively interposed between the source of power line voltage and the motor to obtain either variable speed operation in response to the inverter output voltage or full speed operation in response to the power line voltage.

While particular embodiments of the invention have been described, modifications may be made, and it is intended in the appended claims to cover all such modifications as may fall within the true spirit and scope of the invention.

We claim:

1. A driving system for driving a single phase A-C induction motor at selected, variable speeds comprising:
   a positive D-C voltage of fixed magnitude;
   a negative D-C voltage of the same fixed magnitude;
   means for developing both a sinusoidally weighted pulse width modulated switching signal having a high frequency and a selectively adjustable single phase sine wave modulation signal representative of the desired A-C signal to be applied to the motor, the switching frequency of said switching signal being very high relative to that of the sine wave modulation signal;

means for selectively adjusting at least the frequency of said single phase sine wave modulation signal, as desired, to thereby adjust the speed of the motor;

a low pass filter having an inductance coil, connected in series with the motor, and a capacitor, connected in parallel with the motor, said low pass filter having the capability of filtering out the high frequency components associated with the switching signal and passing along to the motor only the components associated with the sine wave modulation component of the switching signal;

means, including a first power switch, for coupling the motor and low pass filter across the positive D-C voltage;

means, including a second power switch, for coupling the motor and low pass filter across the negative D-C voltage;

means, coupled with said means for developing a switching signal and responsive to said switching signal, for turning said power switch means on in alternation in order to couple the motor and low pass filter alternately to the positive and negative D-C voltages; and said low pass filter filtering out all high frequency signal components and applying to the motor a selectively adjustable single phase sinusoidal voltage having a frequency equal at a given time to the then selected frequency of the sine wave modulation signal, whereby the speed of the motor is controlled by the adjusting means.

2. The driving system of claim 1 further comprising control means for selectively bypassing the output of the first and second power switch means and the low pass filter and applying an A-C power line voltage directly to the motor to drive the motor at a fixed speed determined by the power line frequency.

3. The driving system of claim 1 wherein said means for developing includes a sine wave generator means for producing a single phase sine wave control signal having an adjustable frequency representative of the desired speed of the A-C induction motor and wherein said means for selectively adjusting adjusts both the amplitude and frequency of the control signal.

4. The driving system of claim 3 wherein said means for developing includes a triangular wave generator means for producing a triangular shaped signal having a frequency which is very high relative to the frequency of the single phase sine wave control signal.

5. The driving system of claim 1 further comprising an A-C power line for providing a single phase A-C line voltage at a fixed frequency and means for developing, from said A-C power line voltage, said positive D-C voltage of fixed magnitude and said negative D-C voltage of fixed magnitude.

6. The driving system of claim 4 wherein said means for developing includes a differential comparator coupled with said sine wave generator and said triangular wave generator.

7. The driving system of claim 3 wherein said means for adjusting adjusts the amplitude of the single phase sine wave control signal as a function of the frequency of said single phase sine wave control signal.

8. The driving system of claim 3 wherein said means for adjusting achieves a constant ratio of the amplitude of said single phase sine wave control signal relative to the frequency of said single phase sine wave control signal.

9. The driving system of claim 8 wherein said adjusting means includes a high pass filter, coupled with said sinusoidal voltage generator, which attenuates the amplitude of said sine wave control signal from said sine wave generator in inverse proportion to the frequency of the sine wave control signal.

10. The driving system of claim 4 wherein said triangular wave generator means produces a triangular wave having a frequency of at least 10 kilohertz.

11. The driving system of claims 2 wherein said control means includes means for synchronizing the low pass filter output voltage to the power line voltage immediately prior to a switchover from one voltage source to the other to minimize any electrical disturbance during the switching transition.

12. The driving system of claim 11 including a phase detector for determining when the output voltage from the low pass filter and the power line voltage are in phase, thereby indicating when the frequencies of those voltages are equal, and means for effectively adjusting the amplitude of the output voltage of the low pass filter as a function of, and in direct proportion to, the frequency of the output of the low pass filter so that when the frequency of the low pass filter output voltage equals the fixed frequency of the power line voltage, those two voltages will have approximately the same amplitude.

13. The driving system of claim 2 wherein said bypassing means includes means for determining whether the power line voltage or the low pass filter voltage is supplied to the motor and means for adjusting the amplitude, frequency and phase of the low pass filter voltage as necessary to match the corresponding characteristic of the power line voltage just before a switchover is made from low pass filter voltage to power line voltage, or vice versa, in order to minimize any electrical disturbance during the switching transition.

* * * * *